United States Patent Office 3,394,581
Patented July 30, 1968

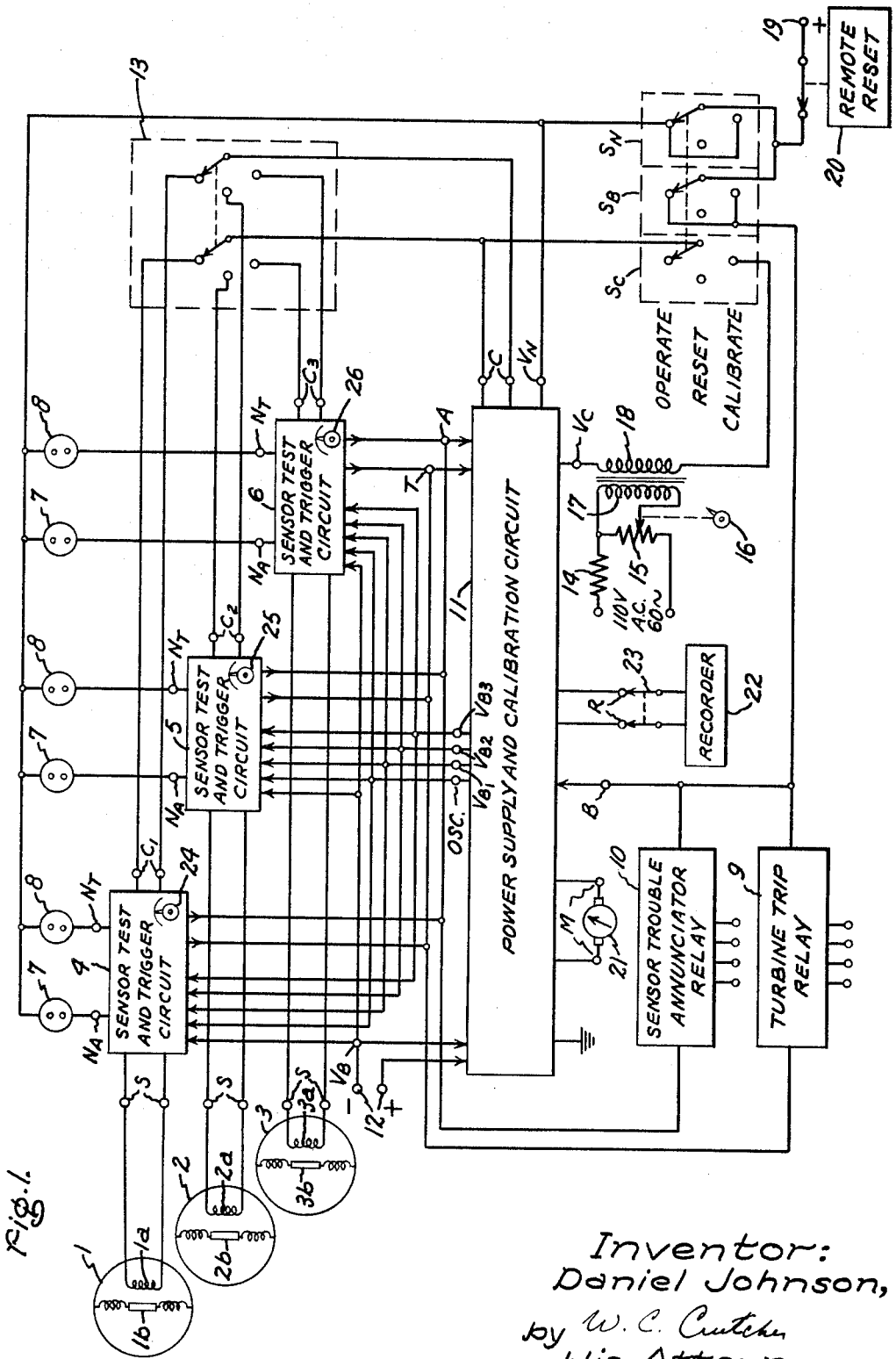

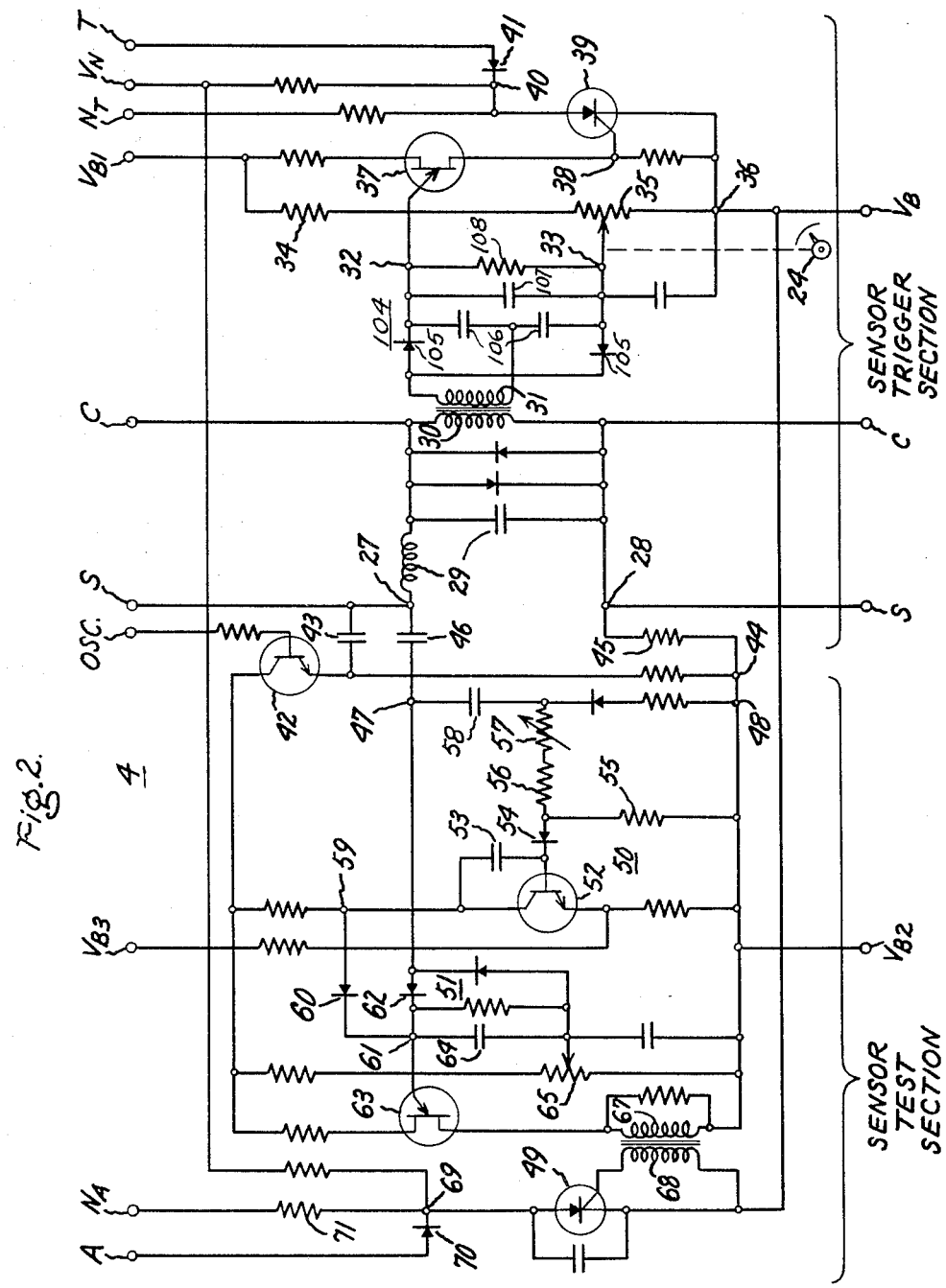

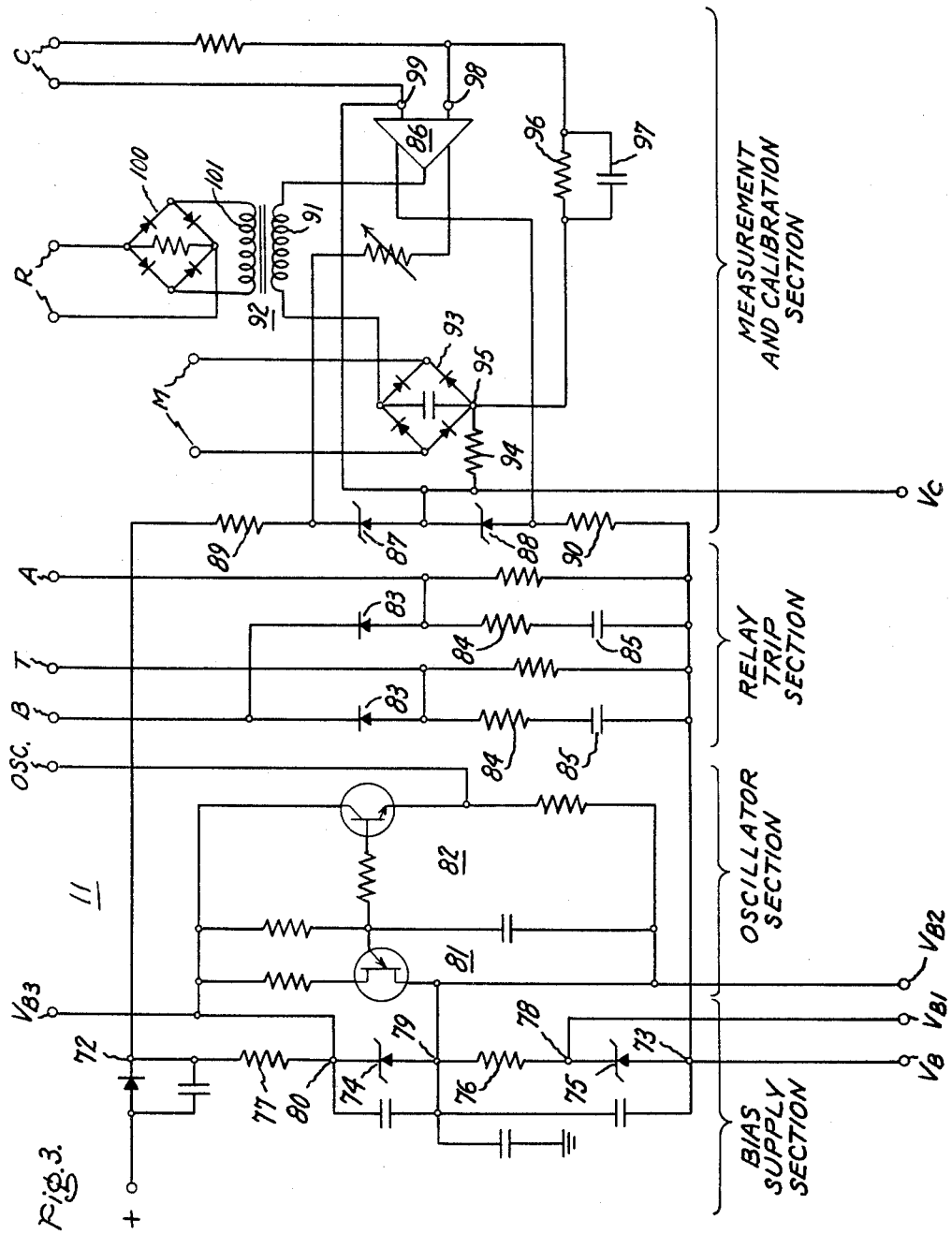

3,394,581
VIBRATION MEASUREMENT, PROTECTION, AND CALIBRATION CIRCUIT
Daniel Johnson, Schenectady, N.Y., assignor to General Electric Company, a corporation of New York
Filed Apr. 5, 1966, Ser. No. 540,399
8 Claims. (Cl. 73—1)

ABSTRACT OF THE DISCLOSURE

Vibration sensor with a coil element is continuously monitored by imposing a voltage across the coil element with a different electrical characteristic from that generated by the sensor. The two amplified voltages independently actuate separate output devices to provide both vibration monitoring and sensor operability monitoring functions. Multi-sensor monitoring, calibration, and low vibration level accuracy are provided through a common power supply, amplifier and calibration circuit.

---

This invention relates to an improved circuit for sensing and measuring the level of vibration at a number of points and actuating an output device when the vibration at any one of the points exceeds a preselected level. The invention includes means for calibrating each of the vibration sensors at the selected level which will cause the output device to be actuated, and includes additional means for testing the operative condition of the separator sensors and giving an indication of trouble through a second output device without actuating the first mentioned output device.

It is often desirable to measure the vibration at several independent selected locations on a piece of rotating equipment, such as a gas turbine. Excessive vibration at any one of these points may give rise to conditions which will damage the equipment and therefore the vibration detector should cause the turbine to shut down when a preselected level of vibration is exceeded. The maximum vibration which is permissible at one location may not be the same level which is permissible at another location. Therefore, the permissible level in each vibration detector should be capable of independent adjustments.

Another problem which arises is the necessity to separately calibrate the vibration detectors to insure that they are actuating the output device at the proper level of vibration. The type of meter which is often employed to obtain an indication of vibration level is substantially nonlinear at low current levels, i.e., it has a deadband which prevents the detection of low levels of vibration. It is desirable when monitoring the vibration or calibrating the vibration detectors to obtain an accurate reading even at low vibration levels.

Another problem with the type of vibration sensor often employed is the possibility of a shorted or grounded coil in the sensor or an open circuit in the wiring or across the sensor element. When such a problem arises, it is very desirable to be able to locate and identify a faulty sensor without causing the monitored equipment to shut down unnecessarily.

Accordingly, one object of the present invention is to provide an improved vibration measurement and protective circuit which will actuate an output device at an independently preselected levels of vibration at any one of several locations.

Another object of the invention is to provide an improved circuit for accurately and independently calibrating the vibration sensor circuits.

Still another object of the invention is to provide an improved circuit for monitoring the operability of independent vibration sensors and enabling identification of faulty sensors without actuating the output device.

Another object is to provide a vibration monitoring circuit which permits the addition of remote monitoring devices without undesirable effects due to loading or malfunction of the remote devices.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing, in which:

FIG. 1 is a simplified schematic view showing the overall arrangement for a vibration measurement and protection circuit having three independent vibration sensing channels, FIG. 2 is a circuit diagram for one of the three identical "sensor test and trigger circuits" shown in FIG. 1, and FIG. 3 is a circuit diagram for the "power supply and calibration circuit" shown in FIG. 1.

Briefly stated, the invention comprises one or more sensor channels which employ a low frequency signal generated by the vibration sensor to trip the output device at a predetermined voltage level, and which at the same time passes a high frequency test signal through the sensor coil which gives an indication if there is a short, ground, or open circuit in the sensor. Additional means are employed to accurately measure the amplitude of the low frequency sensor signal (or of a low frequency calibrating signal substituted therefor) despite nonlinearity of the measuring instruments.

GENERAL ARRANGEMENT

Referring now to FIG. 1 of the drawing, wherein three independent vibration sensing channels are show for purpose of illustration, sensors 1, 2, and 3 are physically attached to the portion of the machine where vibration is to be measured. Sensors 1–3 are commercially available devices which will give an indication in terms of volts per inch per second of peak vibrational velocity. The sensors commonly have coil elements $1a$, $2a$, $3a$ therein in which voltages are induced or otherwise generated due to relative movement of the internal parts $1b$, $2b$, $3b$ and the coil element. A suitable sensor is Model No. 5,470,364 sold by the General Electric Co.

Terminals S of sensors 1, 2 and 3 from the sensor coil elements are connected to their respective "sensor test and trigger circuits" shown schematically at 4, 5 and 6. Each of the sensor circuits has a neon indicating light 7 attached to terminal $N_A$ which is arranged to light when there is an indication of a faulty sensor for that circuit. Similarly, each of the sensor circuits has a neon light 8 connected to terminal $N_T$ which lights when a particular sensor has acted to trip the output device. While lights 7, 8 merely indicate the particular sensor channel which is involved, the circuit includes a common output device shown as turbine trip relay 9 which causes shutdown of the turbine when current flows therethrough due to any one of the sensor channels exceeding its preselected permissible level of vibration. Similarly, a common sensor trouble annunciator relay 10 causes an alarm when any one of the sensor channels indicates a faulty sensor.

Common to all of the sensor carcuits is a single "power supply and calibration circuit" indicated schematically at 11. Circuit 11 is supplied with battery power or rectified DC voltage through terminals 12 and has section therein which provides biasing voltages to each of the sensor circuits from terminals $V_{B1}$, $V_{B2}$ and $V_{B3}$. The negative lead from terminals 12 is also supplied to each of the sensor circuits from common terminal $V_B$. The power supply and calibration circuit also generates a high frequency oscillator signal which is supplied to each of the sensor circuits from terminal OSC.

In order to read the actual vibration existing in any one sensor at a given time, selector switch 13 is used to connect terminals $C_1$, $C_2$, $C_3$ of sensor circuits 4, 5 and 6 respectively to the common terminals C leading to device 11.

A low frequency calibrating signal is provided by employing ordinary 60 cycle line current connected across series connected resistor 14 and potentiometer 15. A selected magnitude is obtained through the tap of potentiometer 15 (controlled by knob 16) and applied to the primary coil 17 of a transformer. The secondary coil 18 of the transformer is connected to terminal $V_C$ and to the calibrate terminal of switch $S_C$. When switch $S_C$ is in the lowermost position, the 60 cycle current in secondary 18 of an adjustable magnitude will be superimposed upon the low frequency signal from a particular sensor channel, or will be substituted therefor if the sensor is not generating a voltage.

Switches $S_B$ and $S_N$ serve to connect the positive terminal 19 from a suitable DC source to terminals B and $V_N$ respectively when the switches are either in the uppermost or lowermost positions. Terminal 19 may be connected to the positive terminal of the aforementioned terminals 12 and supplied from the same source. Resetting of the vibration circuit is accomplished either by placing switches $S_C$, $S_B$ and $S_N$ in the middle position or by actuation of a remote reset device 20, either of which will interrupt the positive voltage supply to terminals B and $V_N$.

The vibration level is read by means of a meter 21 connected to terminals M. In addition, a remote recorder 22, connectable to terminals R through switch 23, may also be used to provide a permanent record of vibration level.

Each of the sensor circuits 4–6 has two outputs, one a signal for actuating the trip relay upon exceeding the permissible vibration level, and the other a signal for indicating a faulty sensor. The former output signal, indicating excessive vibration from each sensor, is connected to terminal T which is connected to the power supply and calibration circuit 11 as well as to one side of turbine trip relay 9. As will be explained, terminal T is normally at a positive voltage equal to that of source terminal 19, but any one sensor can cause terminal T to drop to a minus voltage causing the turbine trip relay 9 to be actuated.

Terminal A is similarly supplied from the sensor testing section of each sensor circuit and is connected to circuit 11 as well as to one side of the sensor trouble annunciator relay 10. It is normally at a positive voltage, but any one sensor can cause it to drop to a negative voltage actuating the trouble annunciator relay 10.

It remains to state that each of the sensor circuits 4, 5 and 6 have external means 24, 25, 26 respectively to adjust the permissible vibration level at which the sensor will actuate the turbine trip relay.

SENSOR TEST AND TRIGGER CIRCUIT

Referring now to FIG. 2 of the drawing, the circuit diagram is shown for one of the sensor test and trigger circuits, such as 4, 5 or 6 which are all identical. The various terminals shown on FIG. 2 correspond to those in FIG. 1. The circuit consists of a sensor trigger section on the right and a sensor test section on the left.

(a) Sensor trigger section

A voltage which is proportional to vibrational peak velocity is inserted at junctions 27, 28 from the sensor terminals S. High frequency components are removed by LC filter 29 and the low frequency portion of the signal is imposed across the terminals of primary coil 30. The voltage induced across the secondary coil 31 is converted to a DC voltage proportional to vibration by means of a network 104, consisting of rectifying diodes 105, voltage doubling capacitors 106, capacitor 107 and resistance 108. The ratio between voltage doubling capacitors 106 and capacitor 107 provides a time delay to prevent tripping from a momentary high vibration signal. Resistance 108 allows capacitor 107 to discharge if the vibration signal decreases.

A selectable DC biasing voltage is added to the aforementioned voltage by means of a voltage divider consisting of resistor 34, potentiometer 35. Thus the voltage across junction 32 and junction 36 is DC voltage indicative of vibration plus an additional DC voltage selectable by potentiometer knob 24.

When the combined DC voltages exceed a certain value, unijunction transistor 37 will conduct causing a pulse at junction 38. This pulse will trigger a silicon controlled rectifier 39 causing it to conduct current supplied from terminal $V_N$ and to continue conducting until voltage from $V_N$ is removed by one of the reset switches. Conduction of SCR 39 causes voltage at junction 40 to drop to the negative voltage on terminal $V_B$. At the same time, diode 41 conducts and terminal T drops to a negative voltage.

Referring back to FIG. 1, it will be seen that when this occurs, current will flow through the turbine trip relay 9 and actuate the output device.

(b) Sensor test section

Referring to the lefthand side of FIG. 2, there is illustrated a section for passing a high frequency test signal through the sensor coils for the purpose of determining whether the sensor is shorted, grounded, or at an open circuit condition. A high frequency signal from the power supply circuit 11 (see FIG. 1) is injected at the OSC terminal of each sensor circuit as in FIG. 2, and is imposed on the base of a power amplifier transistor 42 connected as an emitter follower. The high frequency amplified oscillator signal, which may be, for example, on the order of 20 kc., passes through coupling capacitor 43 and is imposed across the junctions 27, 44 of series-connected sensor coil (junctions 27, 28) and resistor 45. Capacitor 46 admits the high frequency component but blocks low frequency voltages generated in the sensor coil due to actual vibration of the sensor. This high frequency voltage appears across junctions 47, 48 and is of a magnitude which is intermediate between a preselected maximum value and a preselected minimum value. When the test voltage magnitude exceeds the maximum or falls below the minimum, the section is arranged to give a faulty sensor indication.

The circuit is arranged to actuate a silicon-controlled rectifier 49 to give a "faulty sensor" indication, much the same way the previously described silicon-controlled rectifier 39 gave a high level vibration indication. These means include a low magnitude trigger circuit portion indicated generally at 50 and a high magnitude trigger circuit portion indicated generally at 51.

The low magnitude portion 50 includes a transistor 52, feedback capacitor 53, diode 54, and input resistors 55, 56, 57. At intermediate magnitudes of the high frequency voltage across junctions 47, 48, transistor 52 is conducting due to the high frequency current passing through coupling capacitor 58. It will be apparent that a drop in voltage magnitude across junctions 47, 48 will cause transistor 52 to conduct less current. The level is determined by the adjustable resistor 57. This will cause a corresponding rise in voltage at junction 59 causing diode 60 to conduct and raise the voltage at junction 61. The high magnitude portion 51 functions to cause a similar effect at junction 61. When the high frequency voltage at 47 rises in magnitude, diode 62 will conduct increasing the DC voltage at junction 61. A unijunction transistor 63 is biased by the voltage across capacitor 64, which is also connected to junction 61. Adjustability of the firing bias is provided by potentiometer 65 which adjusts the voltage on the other side of the capacitor 64.

Thus, when the magnitude of the high frequency testing voltage across terminals 47, 48 falls below the selected minimum value, the low magnitude circuit portion 50 will cause the voltage at junction 61 to increase, firing the unijunction transistor 63. Similarly, if the high frequency voltage magnitude rises above the selected maximum value, junction 61 will again rise in voltage causing firing of the unijunction transistor 65. In either event, firing of transistor 65 causes a current pulse to flow through primary 67 of a transformer. This in turn causes a similar pulse through secondary 68 to trigger silicon-controlled rectifier 49. In a manner as previously described in connection with a sensor trigger section, junction 69 will drop to a negative voltage and so will terminal A as the diode 70 conducts. Terminal $N_A$ will also drop in voltage to a lesser amount as determined by resistor 71.

In operation, high frequency voltage of an intermediate magnitude will not cause silicon-controlled rectifier 49 to fire. However, if there is an open circuit across the sensor coils, the voltage magnitude will rise causing the silicon-controlled rectifier to fire by means of the elements in the high magnitude portion 51. If either terminal of the sensor coils are grounded, or if there is a short across the sensor coils, the magnitudes of the high frequency voltage will drop causing the silicon-controlled rectifier to fire by means of the low magnitude portion 50.

POWER SUPPLY AND CALIBRATION CIRCUIT

Referring now to FIG. 3 of the drawing, there is shown the power supply and calibration circuit 11 of FIG. 1. This consists of a bias supply section, oscillator section, relay trip section, and a measurement and calibration section.

(a) Bias supply section

As indicated in FIG. 1 a source of DC voltage from a battery or other power supply are introduced from the positive terminal 12 and at the negative $V_B$ terminal 12. This source voltage appears across junctions 72, 73 on the left hand side of the drawing. By means of the voltage divider consisting of Zener diodes 74, 75 and resistors 76, 77, bias voltages for each of the sensor circuits, as well as for the common circuit 11, are established at junctions 78, 79, 80 for the bias terminal $V_{B1}$, $V_{B2}$, $V_{B3}$ respectively.

(b) Oscillator section

The oscillator section consists of a oscillating portion 81 and an emitter follower amplifier 82 providing an amplified 20 kc. signal to terminal OSC. This portion of the circuit is largely conventional and it is believed that no further explanation is necessary.

(c) Relay trip section

This section contains passive circuit elements for preventing unwanted tripping the coils of output relays 9, 10 (FIG. 1). As previously discussed in connection with FIG. 1, the coil of relay 9 is connected across terminals B and T, while the coil of relay 10 is connected across terminals B and A. The circuit elements in this section are in two parallel circuits connected to source terminal B. Depending upon the relay coil involved, diodes 83 prevent inductive voltage surges on interrupting the relay coil current, while series-connected resistor 84 and capacitor 85 in each of the paths serve to prevent rate firing of the silicon-controlled rectifiers.

(d) Measurement and calibration section

The measurement and calibration section includes a high gain DC operational amplifier 86 which is suitably powered by means of Zener diodes 87, 88 and resistors 89, 90 forming a voltage divider across the DC supply voltage. A suitable operational amplifier for this purpose is Model No. ADO3 sold by Fairchild Camera and Instrument Corp. An output path of operational amplifier 86 comprises the primary coil 91 of the recorder transformer 92, a bridge rectifier 93, and resistor 94. A current feedback path for the operational amplifier is established from junction 95 in the output path through resistor 96 and capacitor 97 to input terminal 98 on the amplifier. The differential amplifier 86 has an input terminal 99, which is set at the reference level by virtue of its being connected to the junction between Zener diodes 87, 88. Terminal $V_C$ of the calibrating coil (see FIG. 1), and resistor 94 are also connected to this reference.

The input voltage to terminals 98, 99 of the amplifier 86 depends upon the position of the switch $S_C$ (FIG. 1). When the switch is in the "operation" position, terminals 98, 99 are connected to terminals C which, in turn, are connected to the particular sensor set of selector switch 13.

When switch $S_C$ is set in the "calibrate" position, there is also imposed on terminals C the calibrating voltage appearing across secondary coil 18 of the calibration transformer (FIG. 1). If the sensor connected through selector switch 13 is not vibrating, this 60 cycle calibrating voltage will be substituted for the sensor voltage across the sensor primary coil 30 (FIG. 2). Thus, the 60 cycle calibrating voltage will be supplied to the input of operational amplifier 86 for obtaining a meter reading, as well as being supplied to the individual sensor circuit in lieu of a sensor voltage arising from vibration.

The meter 21, together with its rectifier bridge 93 connected in the output path from amplifier 86 is substantially nonlinear in voltage/current characteristics. The remote recorder 22 connected to terminals R is supplied through a second rectifier bridge 100 from the secondary coil 101 of transformer 92. This arrangement is also substantially nonlinear and in addition there is a possibility of shorts or grounds in the recorder which would otherwise tend to affect the accuracy of meter 21 connected in the same load path. Problems which would ordinarily be encountered due to this nonlinear load are avoided by means of the arrangement shown, wherein the operational amplifier 86 is employed with current feedback from junction 95 to its input terminal 98. Due to the extremely high gain of amplifier 86, the voltage developed at its output end will be whatever is necessary to cause the feedback current to match the input current. This means that sufficient voltage will be developed across the output path to cause current flow through the nonlinear load (consisting of primary coil 91 and bridge circuit 93) in order that the current flow will exactly correspond to the input voltage magnitude (and current), despite the fact that the load is substantially nonlinear in nature. This causes the meter and recorder to register the magnitude of input voltage, even at very low levels. In addition, significant change in the load impedance, such as shorting of recorder terminals R will not affect the accuracy of the meter reading.

In operation, with switch $S_C$ set to "operate" position, the meter and recorder will accurately read the level of vibration corresponding to the voltage developed by the sensor as supplied to terminals C. Voltage levels on different sensors can be obtained by moving the selector switch 13 to the desired sensor.

If calibration of a particular sensor is desired, switch $S_C$ is set to calibrate position, the trip level biasing potentiometer 35 is reduced to zero bias with knob 24, and the magnitude of low frequency calibrating voltage is increased with knob 16 until the desired tripping level is read on meter 21. Then the trip level knob 24 is increased until the SCR 39 fires, as indicated by neon light 8 for the selected sensor. Since the same calibrating voltage is supplied to the sensor trigger section and to the meter, the sensor is considered calibrated to fire at that particular level thereafter.

Continual monitoring for a faulty sensor is accomplished as previously described by the high frequency test signal sent through the sensor coils which will fire SCR 49, actuating the neon light 7, whenever the high frequency voltage rises or falls below selected maximum and minimum levels. Although the preferred embodiment uses a high frequency AC tubing voltage, a DC testing voltage could similarly be passed through the sensor coil element and separated from the low frequency sensor vibrational or calibrating voltage by similar means to those described.

While there has been shown what is considered to be the preferred embodiment of the invention, other modifications will occur to those skilled in the art. It is, of course, intended to cover by the appended claims all such modifications as well within the true spirit and scope of the invention.

What I claim as new and desire to secure by Letters Patent of the United States is:

1. A vibration measuring and sensor testing device comprising:
  a sensor having a coil element therein arranged to generate a relatively low frequency AC sensor voltage indicative of vibrational movement of the sensor,
  means for generating and imposing a testing voltage having electrical characteristics substantially different from said sensor voltage across said coil element,
  circuit means for separating and amplifying the testing and sensor voltage portions,
  means responsive to the sensor voltage portion for actuating a first output device if the sensor voltage deviates substantially from a predetermined value, and
  means responsive to the testing voltage portion for actuating a second independent output device if the testing voltage deviates substantially from a predetermined value.

2. The combination according to claim 1, wherein said testing voltage generating means comprises an oscillator connected to impose a high-frequency AC testing voltage across the coil element of the sensor.

3. The combination according to claim 1, wherein said sensor voltage responsive means actuates the first output device if the magnitude of the sensor voltage rises above a predetermined level and wherein the testing voltage responsive means independently actuates the second output device if the magnitude of the testing voltage either rises above a preselected maximum level or falls below a preselected minimum level.

4. The combination according to claim 1, including additional means for introducing a low-frequency AC calibrating voltage into said circuit means for actuating the first output device, together with means for adjusting the point at which the first output device is actuated by said calibrating voltage.

5. The combination according to claim 1, wherein said circuit means includes elements arranged to rectify the sensor voltage and to add an adjustable DC bias voltage thereto for setting the level at which the circuit means actuates the first output device.

6. The combination according to claim 1, wherein there are a plurality of said sensors and a plurality of said circuit means, each circuit means being associated with one of said sensors, and wherein said means for generating the testing voltage and for actuating the first and second output devices are common to all of said sensors and circuit means, whereby vibration level and sensor operability are continuously monitored at several locations.

7. The combination according to claim 1, wherein additional means are provided for indicating actual vibration level, comprising an operational amplifier responsive to sensor voltage connected to the input thereof, current responsive means connected to the output of the operational amplifier and adapted to indicate vibration level, said current responsive means having a non-linear voltage/current characteristic, means providing a current feedback path to the input of the operational amplifier for supplying current feedback indicative of current flowing through the current-responsive means, whereby low levels of sensor voltage give corresponding indications of vibration level despite the non-linear characteristic of said current responsive means.

8. A vibration measuring and sensor testing device comprising:
  (a) a plurality of sensors having coil elements therein arranged to generate relatively low frequency AC sensor voltages indicative of vibrational movement of the individual sensors,
  (b) first means common to all of said sensors comprising an oscillator arranged to generate a relatively high frequency AC testing voltage and connected to impose said testing voltage across the coil elements of the sensors,
  (c) a pluarity of circuit means each associated with each of said sensors and adapted to separate and amplify the testing and sensor voltage portions,
  (d) each of said circuit means including means for rectifying the sensor voltage and adding an adjustable DC bias voltage thereto for setting the output voltage from each of the separate sensors at a given sensor vibrational level,
  (e) a calibration and measurement circuit common to all of said sensors, including a selector switch arranged to connect the calibration and measurement circuit to a circuit means associated with an individual sensor, said calibration and measurement circuit comprising:
    (1) means for introducing a low-frequency AC calibrating voltage through said selection switch into the circuit means associated with a sensor so as to serve as a substitute for the sensor voltage, and
    (2) means for measuring vibration level in the selected sensor comprising an operational amplifier responsive to sensor voltage connected to the input thereof, current-responsive means connected to the output of the operational amplifier, and adapted to indicate vibration level, said current-responsive means having a non-linear voltage/current characteristic, and means providing a feedback path for supplying a feedback signal to the input of said amplifier indicative of current flowing through the current-responsive means,
  (f) means common to all of the sensors responsive to the output of the circuit means associated therewith and arranged to actuate a first output device if the voltage magnitude rises above a predetermined level, and
  (g) means common to all of the sensors and responsive to the output of the circuit means associated therewith for actuating a second independent output device if the testing voltage rises above a predetermined maximum level or falls below a predetermined minimum level.

References Cited

UNITED STATES PATENTS

| | | | |
|---|---|---|---|
| 2,305,267 | 12/1942 | Minor et al. | 73—71.2 |
| 2,796,600 | 6/1957 | Church | 340—261 |
| 2,987,712 | 6/1961 | Polyzou | 340—409 |
| 3,044,734 | 6/1962 | Heppe | 340—409 |
| 3,252,001 | 5/1966 | Thompson | 340—261 X |
| 3,308,647 | 3/1967 | Crawford | 73—71.2 |

DAVID SCHONBERG, *Primary Examiner.*

S. C. SWISHER, *Assistant Examiner.*